United States Patent [19]

Meisenheimer, Jr.

[11] 4,000,758
[45] Jan. 4, 1977

[54] FLUID RESERVOIR DEVICE WITH FILL MEANS, LEVEL INDICATOR MEANS AND PRESSURE RELIEF MEANS

[76] Inventor: Daniel T. Meisenheimer, Jr., 404 Longmeadow Road, Orange, Conn. 06477

[22] Filed: Oct. 21, 1974

[21] Appl. No.: 516,727

[52] U.S. Cl. .................................. 138/31; 92/62; 92/63; 137/492.5
[51] Int. Cl.² ...................................... F16L 55/04
[58] Field of Search ............ 138/30, 31; 92/62, 63; 137/494, 492.5

[56] References Cited

UNITED STATES PATENTS

| | | | |
|---|---|---|---|
| 1,450,893 | 4/1923 | Morrow | 137/492.5 |
| 2,469,794 | 5/1949 | Sloan | 138/31 |
| 3,815,628 | 8/1973 | Ferrill | 137/494 |

Primary Examiner—Harry N. Haroian
Assistant Examiner—James E. Bryant, III
Attorney, Agent, or Firm—Wooster, Davis & Cifelli

[57] ABSTRACT

A fluid reservoir device for use in conjunction with fluid-filled systems, such as helicopter blade dampers, comprises a cylindrical chamber wall closed across its bottom by a mounting shank having a fluid inlet opening formed therethrough. A first piston is slideably mounted within the cylindrical chamber wall and spring biased downwardly therein, and a second piston is slideably mounted in the first piston, and is spring biased downwardly therein, the combined work surfaces of the first and second pistons closing the cylindrical chamber wall wherein a chamber is defined having a volume which varies according to the positions of the first and second pistons. The chamber is filled by moving the first piston (and the second piston mounted therein) upwardly, and the first piston is spring biased downward to force fluid from the chamber to the fluid-filled system as required. If additional fluid is forced from the fluid-filled system into the chamber, it is accommodated by driving the second piston upwardly to increase the volume of the chamber. Fluid escape means comprises a fluid escape passage normally blocked by a spring biased piston which lifts under excessive pressure to bleed fluid from the chamber, thereby relieving the excessive pressure condition.

12 Claims, 6 Drawing Figures

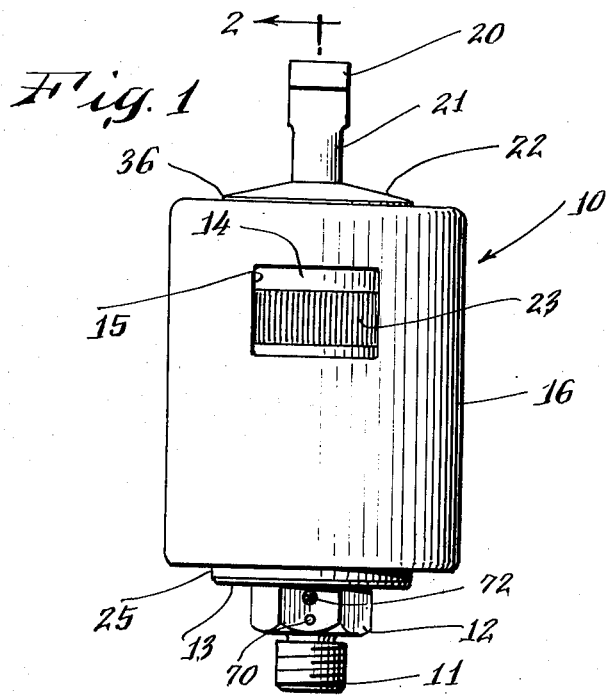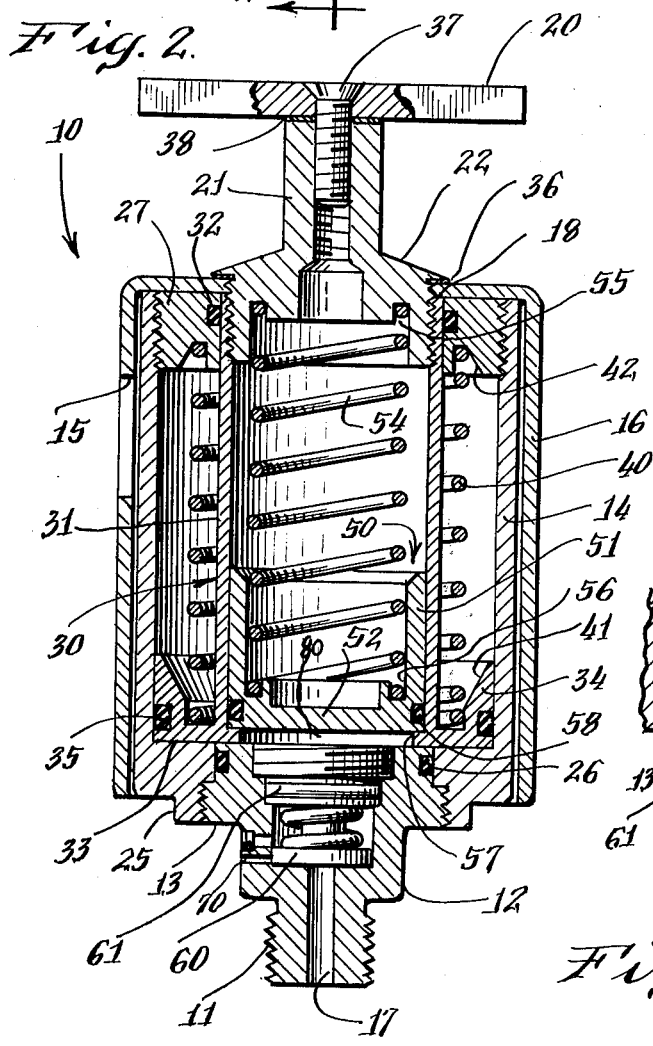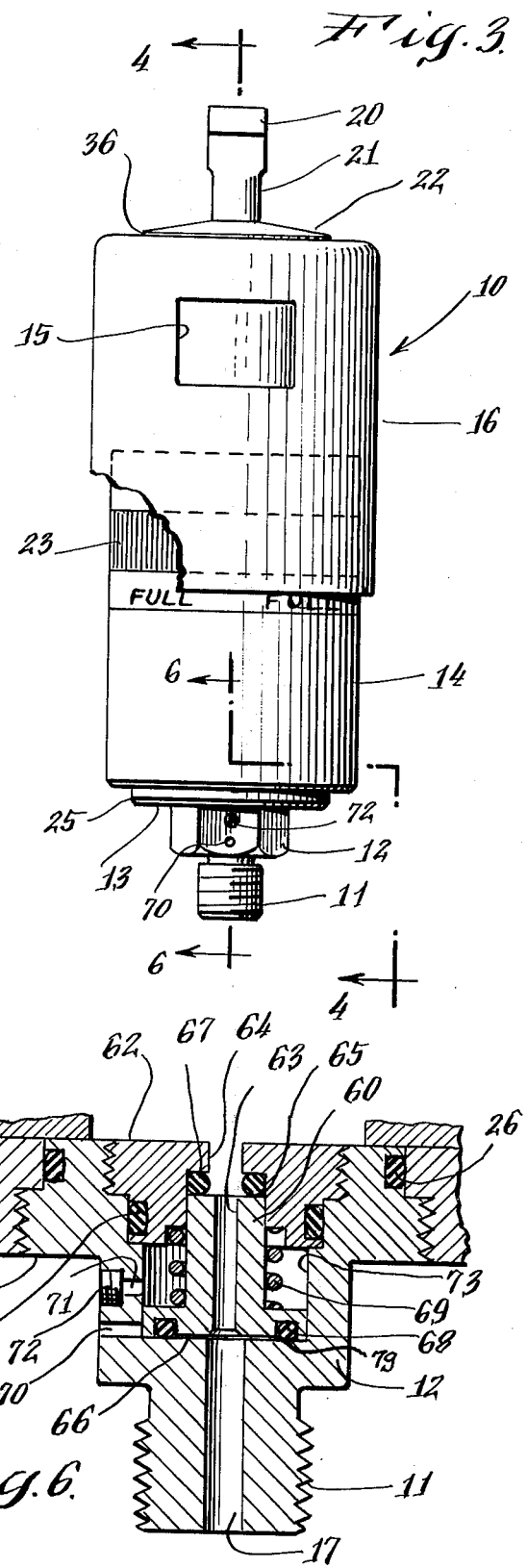

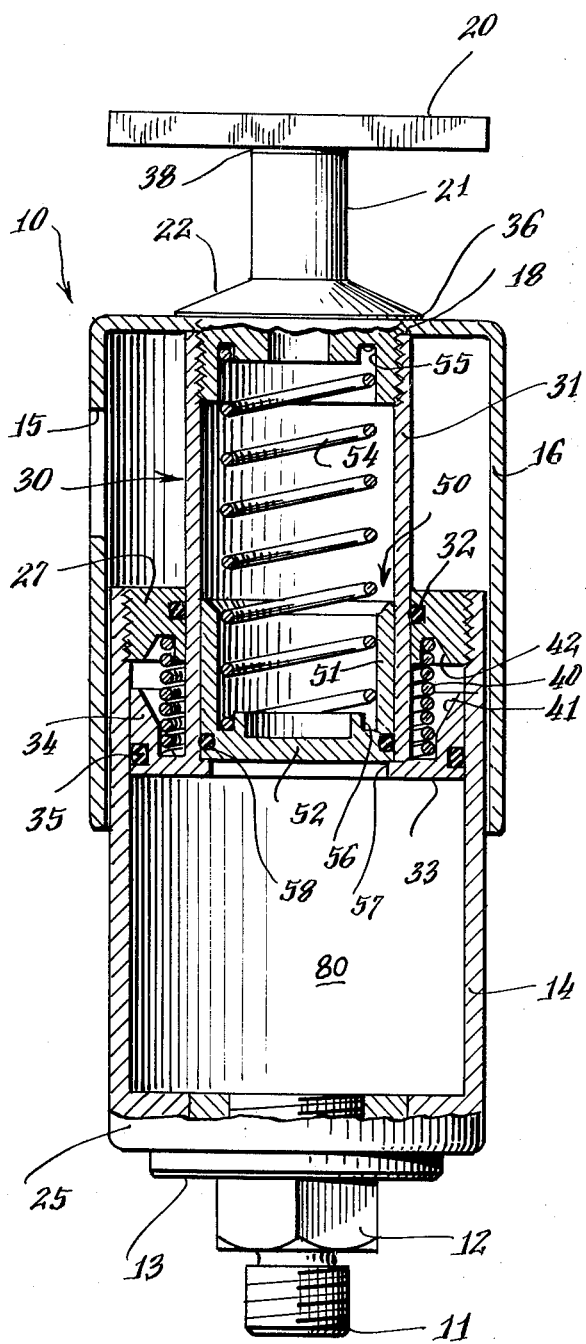
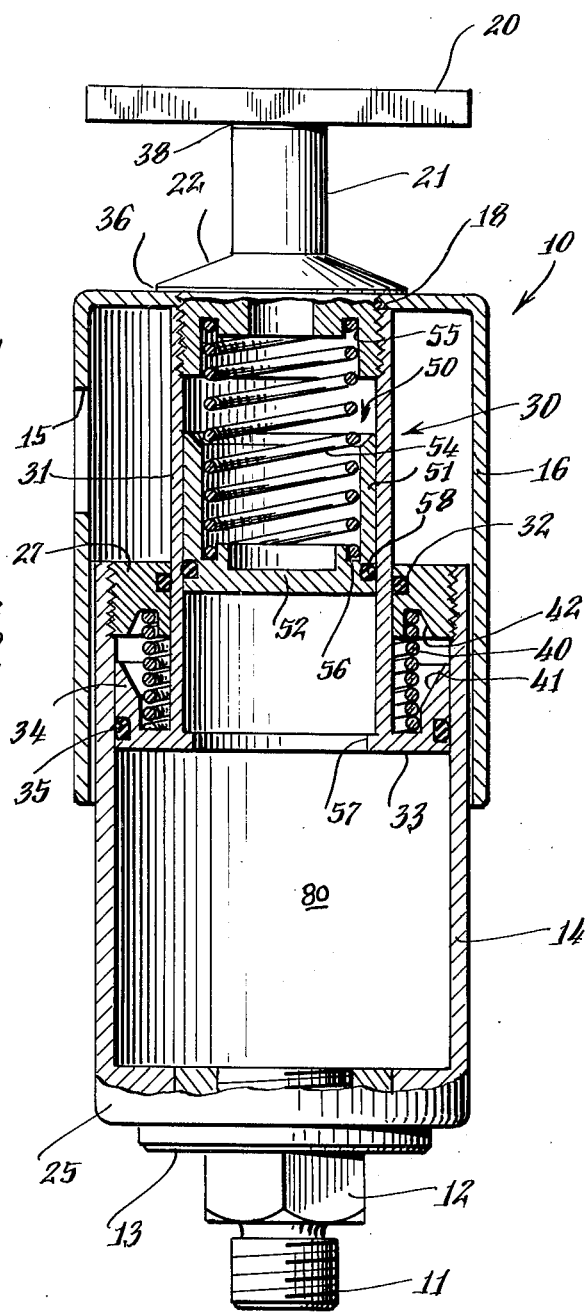

FLUID RESERVOIR DEVICE WITH FILL MEANS, LEVEL INDICATOR MEANS AND PRESSURE RELIEF MEANS

This invention relates to a fluid reservoir device with fill means and level indicator means, and incorporates means for pressure relief.

SUMMARY OF THE INVENTION

A fluid reservoir device, according to the invention herein, is designated for attachment to sealed fluid-filled cavities or pressurized fluid systems. Helicopter blade dampers, which are filled with a low viscosity oil, represent one type of such fluid systems. When mounted on a helicopter blade damper, the fluid reservoir device provides replacement of fluid lost therefrom through small leaks or seepage. The fluid reservoir device includes means for showing the level of fluid contained therein, which is indicative of the amount of extra fluid which has been supplied from the fluid reservoir device to maintain the fluid system in a "full" condition. Of course, a steady drop in the level of fluid in the fluid reservoir device is also indicative of possible leaks in the fluid system, and would warrant thorough inspection of the fluid system.

The fluid reservoir device, according to the invention herein, also provides for expansion of the fluid in the fluid system due to thermal effects and further accommodates surges of fluid from whatever source, such as those caused by operation of the fluid system or by inward deformation of the walls of the fluid system. The fluid reservoir device also includes means for bleeding fluid from the fluid system to relieve excessive pressure therein and prevent damage to the fluid system. The fluid reservoir device, according to the invention herein, is light weight and rugged, and is therefore suitable for use in a helicopter or similar environment.

The fluid reservoir with fill means, level indicator means, and expansion relief means, according to the invention herein, comprises three pistons closing a chamber in fluid communication with a fluid system. A large outer piston is manually upwardly displaceable to fill the chamber and to thereby provide a reservoir of fluid, and the large outer piston is spring-biased downward to reduce the volume of the reservoir and provide fluid to the fluid system to maintain the fluid system in a full condition. A second piston forms a portion of the working area of the large outer piston, and is upwardly displaceable with the large piston. When the reservoir is full and the pressure of the system increases due to whatever cause, the second piston is further upwardly displaced against a biasing spring to accommodate extra fluid in the reservoir and thereby to relieve the excessive pressure condition. If the pressure in the system rises to a level which may damage the system, a third piston located near the opening to the chamber rises to expose a fluid excape port, thereby bleeding fluid from the system until its pressure has been reduced to a satisfactory level. An outer cover connected to the large piston moves relative to the outer wall of the chamber, and provides visual indication of the fluid level in the reservoir. Alternatively, the large piston itself may serve as the fluid level indicating means.

OBJECTS OF THE INVENTION

Accordingly, it is a principal object of the invention to provide a fluid reservoir device for supplying additional fluid to fluid systems in order to maintain the fluid systems in a full condition.

It is another object of the invention to provide a fluid reservoir device for use with a fluid system wherein the fluid reservoir device accommodates expansion or surges of the fluid in the fluid system.

It is a further object of the invention to provide a fluid reservoir device for use with a fluid system wherein the fluid reservoir device incorporates means for relieving pressure in the fluid system by bleeding fluid therefrom in the event that the pressure in the fluid system becomes excessively high.

It is an additional object of the invention to provide a fluid reservoir device incorporating a positive manual fill means.

It is yet another object of the invention to provide a fluid reservoir device which provides visual indication of the level of the fluid contained therein.

Other and more specific objects of the invention will be part obvious and will in part appear from the perusal of the following description of the preferred embodiment and the claims, taken together with the drawings.

DRAWINGS

FIG. 1 is a side elevation view of a fluid reservoir device, according to the invention herein, in its empty condition;

FIG. 2 is an enlarged sectional view taken along lines 2—2 of FIG. 1 of the fluid reservoir device of FIG. 1 in its empty condition;

FIG. 3 is a side elevation view of the fluid reservoir device of FIG. 1 in its full condition FIG. 4 is an enlarged sectional view taken along the line 4—4 of FIG. 3 of the fluid reservoir device of FIG. 1 in its full condition;

FIG. 5 is a sectional view similar to FIG. 4 of the fluid reservoir device of FIG. 1 and showing provision for accommodating additional fluid therein; and FIG. 6 is an enlarged fragmentary sectional view taken along the line 6—6 of FIG. 3 of the fluid reservoir device of FIG. 1 showing means for relieving excessive pressure therein.

The same reference numbers refer to the same elements throughout the various Figures.

DESCRIPTION OF THE PREFERRED EMBODIMENT

The invention herein relates to a fluid reservoir device for use in conjunction with a fluid-filled system. The fluid reservoir device including fill means, level indicator means and means for accommodating expansion of fluid in the system and relief of the excessive pressure in the system.

Referring now to FIG. 1, there is shown a fluid reservoir device 10 according to the invention herein. The fluid reservoir 10 comprises a threaded shank 11 having a hexagonal portion 12 for mounting the fluid reservoir device to a fluid-filled system. The shank 11 includes an integral lower collar 13 to which is secured a cylindrical chamber wall 14 seen in FIG. 1 through an opening 15 in a cylindrical cover 16. The cover 16 is slideably positioned over the chamber wall 14. A handle 20 is attached to a handle shank 21 having an enlarged base portion 22 which is secured to the cover 16 as will be more fully described hereinafter.

In FIG. 1, the fluid reservoir is shown empty, and the opening 15 in the cover 16 reveals an anodized band 23 which may be red, placed on the outer chamber wall 14 for visually alerting observers that the reservoir is empty.

The fluid reservoir 10 is shown in section in FIG. 2. It can be seen that the lower collar 13 comprising a portion of the mounting shank 11 is threaded into an inwardly protruding bottom flange 25 integral with the cylindrical chamber wall 14. An O-ring 26 is provided to seal the connection therebetween. An upper annular collar 27 is threaded into the upper opening of the cylindrical chamber wall 14. A first large outer piston 30 of the fluid reservoir device 10 comprises a cylindrical portion 31 slidingly received in the upper annular collar 27. An O-seal 32 is provided in an annular flange in the top collar to seal the interface between the top collar and the cylindrical portion 31. The piston 30 further comprises an annular bottom "working surface" portion 33 having an upturned outer peripheral flange 34 integrally formed therewith. The flange 34 mates with the interior of the cylindrical chamber wall 14, and an O-seal 35 carried in an annular groove in the flange 34 provides sealing between the flange 34 and the chamber wall 14.

The cover 16 has an opening in the top thereof, and the cover engages the top of the cylinder 31 about the periphery of the opening as indicated at 18. The interior of cylindrical portion 31 of piston 30 is threaded to receive the threaded base 22 of the handle shank 21. A seal 36 is provided between the cover 16 and the base 22 of handle shank 21. The handle 20 is secured to the handle shank 21 by means of a bolt 37 with lockwasher 38 provided between the handle 20 and the handle shank 21. The handle 20, the handle shank 21 and its base 22, the cover 16 and the piston 30 are thereby secured together in a subassembly which is moveable up and down with respect to the chamber wall 14.

A coil spring 40 is provided to bias piston 30 (and the associated subassembly comprising the handle, handle shank and cover) downwardly within the cylindrical chamber wall 14. The coil spring 40 is seated at its lower end in a V-shaped annular recess 41 formed between the outer peripheral flange 34 and the cylindrical portion 31 of piston 30, wherein the coil spring 40 bears on the top of the annular bottom portion 33 of piston 30. The upper end of coil spring 40 is seated in a V-shaped annular recess 42 formed in the upper collar 27. The coil spring 40 loosely surrounds the cylindrical portion 31 of piston 30, which provides support in case the spring should buckle.

The fluid reservoir device 10 further comprises a second inner piston 50, which is concentric with the first piston 30 in the embodiment shown. The piston 50 comprises a cylindrical portion 51 which is slidingly received within the cylindrical portion 31 of piston 30, and an O-seal 58 is provided for sealing between piston 50 and piston 30. The piston 50 further comprises a bottom "working surface" 52. A coil spring 54 extending between an annular groove 55 opening downwardly from the base portion 22 of handle 21 and an annular groove 56 in piston 50 biases the piston 50 downwardly, wherein the peripheral edge of the bottom "working surface" 52 rests against an inwardly protruding annular flange 57 comprising a portion of the annular bottom portion 33 of piston 30. Spring 54 has a higher spring load than spring 40, i.e. taking into account the respective working surfaces of pistons 30 and 50, springs 40 and 54 are chosen such that piston 30 will be driven to its uppermost position before piston 50 is driven relative to piston 30.

When piston 50 is in its lower position, as is shown in FIG. 2, the bottom "working surface" 52 of piston 50 closes the circular opening in the annular bottom surface 33 of piston 30, and the piston 30 and piston 50 thereby together close the area defined by the cylindrical chamber wall 14. Referring now to FIG. 6, which is a fragmentary sectional view of the lower portion of the fluid reservoir device 10, a collar 62 is shown threadedly mounted into the lower collar 13 of the mounting shank 11. Collar 62 together with collar 25 close the bottom area defined by the cylindrical chamber wall 14 except for an inlet passage 64. A chamber 80 is thereby formed, the chamber 80 being defined by the collars 25 and 62, the cylindrical chamber wall 14 and the pistons 30 and 50. The chamber 80 has a variable volume which depends on the positions of pistons 30 and 50, as best seen in FIGS. 2, 4 and 5.

Referring again to FIG. 6, a third piston 60 of the fluid reservoir device 10 is shown. Piston 60 is mounted in a chamber which is defined by the lower surface of the collar 62 and by the interior surface 73 of the mounting shank 11 in the vicinity of the hex portion 12. As noted above, the shank 11 has a passage 17 formed therethrough, and the piston 60 has a passage 63 aligned with the passage 17 and with the passage 64 formed through the upper collar 62, wherein the aligned passages admit fluid to the chamber 80.

The piston 60 has an inverted T-shaped cross section, and accordingly has a top surface 65 which is smaller than its bottom surface 66. An annular O-seal 67 is positioned between the top surface 65 of piston 60 and the collar 62. The portion of the top surface 65 within the annular O-seal 67 is the top "working surface" of piston 60. An O-seal 68 is carried in an annular groove 79 in the bottom surface of piston 60, and the portion of the bottom surface 66 within the O-seal 68 defines the bottom "working surface" of piston 60. The O-seal provides a seal between the bottom surface 66 of piston 60 and the adjacent surface of mounting shank 11. Inasmuch as the bottom working surface of piston 60 is larger than the top working surface of piston 60, piston 60 has a net working surface which tends to move piston 60 upward upon application of pressure in the fluid surrounding the piston. A coil spring 69 surrounds piston 60 and seats against collar 62 to bias the piston 60 downwardly against such pressure. The spring load of spring 69 is higher than the spring load of either spring 40 or spring 54, i.e. both pistons 30 and 50 move prior to piston 60. An opening 70 is provided through the mounting shank 11 to the piston 60 near the bottom surface 66 thereof. A second opening 71 having a filter 72, is formed through the mounting shank 11 to the chamber in which piston 60 is positioned to prevent build-up of back pressure.

The fluid reservoir device 10 may be attached to a fluid-filled system by screwing shank 11 into a threaded opening in the housing of such a system. When the fluid system is filled with fluid, the handle 20 of the fluid reservoir device 10 is pulled upwardly to the position illustrated in FIG. 3 to fill chamber 80. It is preferable to fill the fluid reservoir device while a supply of fluid is still attached to the fluid system so that the fluid drawn into the fluid reservoir device can be replaced in the system. A "Full" mark may be placed on the outer surface of the cylindrical chamber wall as shown in FIG. 3, and the "Full" mark will be exposed when the cover 16 is up to provide a visual indication that chamber 80 is full. Alternatively, the cover 16 can be omitted and a "Full mark" can be placed on the outer surface of cylindrical portion 31 of piston 30, wherein the "Full" mark would be exposed above upper collar 27.

Referring now to FIG. 4, there is shown a sectional view of the fluid reservoir device 10 in its "Full" condition. The subassembly comprising the handle 20 and handle shank 21, the cover 16, the piston 30 and the piston 50 is in its up position, wherein the volume of chamber 80 is enlarged. Of course, as the pistons 30 and 50 are moved upwardly by pulling the handle 20, fluid is drawn into the chamber 80.

It will also be noted that spring 40 is compressed during the fill operation and remains compressed so long as chamber 80 of the fluid reservoir device is full. Therefore, if the fluid-filled system to which the fluid reservoir device 10 is attached should lose some of its fluid, or if the volume of the fluid should decrease, as for instance by contraction in cold environments, the spring 40 biases the piston 30 downwardly to provide additional fluid from chamber 80 into the fluid-filled system. Piston 50 also moves downwardly with piston 30. The cover 16 also moves downwardly with piston 30, providing visual indication that a portion of the fluid in the fluid reservoir device has been delivered to the fluid-filled systems. If most or all of the fluid has been forced from the fluid reservoir device 10, the band 23 is exposed through window 15 in cover 16 to alert observers of the low fluid condition. If no cover is provided, a green band can be placed on the outer surface of cylindrical portion 31 of piston 30, and visual indication that all or most of the fluid in the reservoir is in use is provided when the green band is obscured by the upper collar 27.

Referring now to FIG. 5, if the pressure of the fluid in the fluid-filled system should increase, such as by expansion of the fluid or by a reduction in volume of the fluid-filled system due to inward deflection of the system housing, the second piston 50 will be driven upwardly against spring 54 to accommodate fluid forced from the fluid-filled system because of the high pressure condition. Upon a return to a normal fluid pressure in the fluid-filled system, the piston 50 will be forced downwardly by spring 54 to the position shown in FIG. 4. Thus, the fluid reservoir device 10 provides for variations in pressure and/or volume of the fluid-filled system to which it is attached.

It should be noted that if some of the fluid in chamber 80 has been supplied to the fluid-filled system and if the pressure of the fluid in the fluid-filled system thereafter increases, the first piston 30 will be driven upwardly until the chamber 80 is "Full" prior to the second piston 50 being driven upward to accommodate additional fluid. The resultant indication that the fluid reservoir device is full is not a false indication, because the fluid reservoir device is, in fact, full, notwithstanding the fact that the full condition was caused by a change in the parameters of the fluid-filled system.

When the fluid reservoir device 10 has assumed the configuration shown in FIG. 5, i.e. when both piston 30 and piston 50 are in their uppermost positions, no extra fluid can be accommodated in the chamber 80 to alleviate a high pressure condition within the fluid-filled system. If the high pressure condition persists and is sufficiently strong, it will cause piston 60 to rise against spring 69, establishing fluid communication between passageway 17 and opening 70 to permit fluid to escape from the fluid-filled system and thereby relieve the high pressure condition. The release of fluid will not occur until both pistons 30 and 50 have been driven upwardly against their respective springs 40 and 54 because spring 69 has a higher spring load than either springs 40 or 54. In addition, the spring rte of spring 69 is preferably chosen such that release of fluid will occur only at high pressures which might impair the effective operability of the fluid-filled system or damage either the fluid-filled system or the fluid reservoir device itself.

In the preferred embodiment of the fluid reservoir device 10 for use with the helicopter blade damper, the spring rate of the first spring 40 is chosen to provide a minimum of 5 PSIG charge pressure in its most extended condition, i.e. when chamber 80 contains a minimum volume of fluid, and to provide approximately 7 PSIG charge pressure in its most compressed condition, i.e. when chamber 80 contains a full volume of fluid. The spring 54 has a spring rate chosen to provide additional volume within the chamber 80 when the pressure of the fluid reaches approximately 30 to 50 PSIG. The spring rate of spring 69 is chosen to provide pressure relief when the fluid pressure reaches approximately 100 PSIG. The spring rates of the various springs are, of course, selected according to the desired application of the fluid reservoir device; however, the springs 40, 54 and 69 should respectively increase in spring load to provide the operation of the fluid reservoir device 10 as described above.

The fluid reservoir device 10, according to the invention herein, has several advantages. First, because it is manually filled by an upward stroke of handle 20, filling the fluid reservoir device is a positive and simple operation. The fluid reservoir device accomplishes a positive feed of additional fluid to the fluid-filled system should the system require additional fluid because of small leaks, seepage, temperature changes, or the like. The fluid reservoir device 10 provides a desired visual indication of the fluid level therein, and readily admits provision of visual aids such as the anodized red band 23 and the "Full" marking. The fluid reservoir device accommodates small fluctuations of high pressure in the fluid-filled system to which it is attached without loss of fluid, and further provides relief of excessively high pressure by bleeding fluid from the system to prevent damage to the system or to the fluid reservoir device itself.

Accordingly, the fluid reservoir device described above efficiently accomplished the objects of the invention herein. It should be understood, however, that the foregoing description is directed to a preferred embodiment of the invention, and variour changes from the preferred embodiment shown and described may be made without departing from the spirit and scope of the invention, which is limited only by the following claims.

I claim:

1. A fluid reservoir device for connection to and use in conjunction with a fluid-filled system, the fluid reservoir device comprising:
   A. means defining a chamber having a volume, said means also defining an inlet opening into said chamber, a fluid bleed passage connecting with the inlet opening into said chamber, and a first piston-receiving opening in said chamber, said means being adapted for attachment to a fluid-filled system with the inlet opening in communication with fluid in said fluid-filled system;
   B. a first piston slideably mounted in and closing said first piston-receiving opening in said chamber, said first piston slideable between (1) a first position displacing a maximum first piston volume and thereby decreasing the volume of the chamber by said maximum first piston volume, and (2) a second position displacing a minimum first piston volume thereby decreasing the volume of said chamber by a minimum first piston volume;

C. spring biasing means for sliding said first piston from said first position to said second position to decrease the volume of said chamber; and D. pressure responsive means normally blocking said fluid bleed passage and unblocking said fluid bleed passage in response to excessive fluid pressure, thereby relieving excessive pressure in said fluid-filled system and said fluid reservoir device by bleeding fluid from said chamber through said fluid bleed passage, said pressure responsive means comprising 1. a piston slideably mounted in the inlet opening to said chamber, the piston defining an opening therethrough to permit passage of fluid from the fluid-filled system to the chamber, and 2. spring biasing means normally maintaining said piston in a position blocking said fluid bleed passage, said piston having a working surface exposed to the fluid such that excessive pressure of the fluid lifts the piston against its spring biasing means to permit fluid to escape through the fluid bleed passage, whereby when said chamber is filled with fluid with the first piston in a position such that it displaces less than its maximum volume, the spring biasing means slides the first piston towards its first position to supply fluid from the chamber to the fluid-filled system when extra fluid is required to maintain the fluid-filled system in a full condition.

2. A fluid reservoir device for connection to and use in conjunction with a fluid-filled system, the fluid reservoir device comprising:

A. means defining a chamber having a volume, said means also defining an inlet opening into said chamber and first and second piston-receiving opening in said chamber, said means being adapted for attachment to a fluid-filled system with the inlet opening in communication with fluid in said fluid-filled system;

B. a first piston slideably mounted in and closing said first piston-receiving opening in said chamber, said first piston slideable between (1) a first position displacing a maximum first piston volume and thereby decreasing the volume of the chamber by said maximum first piston volume, and (2) a second position displacing a minimum first piston volume thereby decreasing the volume of said chamber by a minimum first piston volume;

C. first spring biasing means for sliding said first piston from said first position to said second position to decrease the volume of said chamber;

D. a second piston slideably mounted in and closing the second piston receiving opening into said chamber, said second piston slideable between (1) a first position displacing a maximum second piston volume and thereby decreasing the volume of the chamber by said maximum second piston volume, and (2) a second position displacing a minimum first piston volume thereby decreasing the volume of said chamber by said minimum second piston volume; and E. second spring biasing means for sliding said second piston toward its first position displacing a maximum second piston volume, said second spring biasing means having a higher spring load than the first spring biasing means for said first piston;

whereby when said chamber is filled with fluid with the first piston in a position such that it displaces less than its maximum volume, the spring biasing means slides the first piston towards its first position to supply fluid from the chamber to the fluid-filled system when extra fluid is required to maintain the fluid-filled system in a full condition, and whereby increased pressure of the fluid in the fluid-filled system first drives the first piston to its second position and thereafter drives the second piston against its spring biasing means to its second position, thereby increasing the volume of fluid accommodated in the chamber and thereby lowering the increased pressure in the fluid-filled system.

3. A fluid reservoir device as defined in claim 2 and further comprising:

F. means defining a fluid bleed passage from the chamber of fluid reservoir device, and pressure responsive means normally blocking said fluid bleed passage and unblocking said fluid bleed passage in response to excessive fluid pressure, thereby relieving excessive pressure in said fluid-filled system and said fluid reservoir device by bleeding fluid from said chamber through said fluid bleed passage.

4. A fluid reservoir device as defined in claim 2 and further comprising:

F. a handle connected to said first piston for manually moving said piston from its first position to its second position to increase the volume of said chamber, whereby manually moving said handle and said piston draws fluid into said chamber from said fluid-filled system.

5. A fluid reservoir device for connection to and use in conjunction with a fluid-filled system, the fluid reservoir device comprising:

A. means defining a chamber having a volume, said means also defining an inlet opening into said chamber and a first piston-receiving opening in said chamber, said means being adapted for attachment to a fluid-filled system with the inlet opening in communication with fluid in said fluid-filled system;

B. a first piston slideably mounted in and closing said first piston-receiving opening in said chamber, the volume of said chamber according to the first piston slideable between (1) a first position displacing s maximum first piston volume and thereby decreasing the volume of the chamber by said maximum first piston volume, and (2) a second position displacing a minimum first piston volume thereby decreasing the volume of said chamber by a minimum first piston volume, said first piston defining a second piston-receiving opening in said chamber;

C. first spring biasing means for sliding said first piston from said first position to said second position to decrease the volume of said chamber;

D. a second piston slideably mounted in and closing the second piston receiving opening in said chamber defined by said first piston, said second piston slideable between (1) a first position displacing a maximum second piston volume and thereby decreasing the volume of the chamber by said maximum second piston volume, and (2) a second position displacing a minimum first piston volume thereby decreasing the volume of said chamber by said minimum second piston volume; and F. second spring biasing means for sliding said second piston toward its first position displacing a maximum second piston volume, said second spring biasing means having a higher spring load than said first spring biasing means;

whereby when said chamber is filled with fluid with the first piston in a position such that it displaces less than its maximum volume, the spring biasing means slides the first piston towards its first position to supply fluid from the chamber to the fluid-filled system when extra fluid is required to maintain the fluid-filled system in a full condition, and whereby increased pressure of the fluid in the fluid-filled system first drives the first piston to its second position and thereafter drives the second piston against its spring biasing means to its second position, thereby increasing the volume of fluid accommodated in the chamber and thereby lowering the increased pressure in the fluid-filled system.

6. A fluid reservoir device as defined in claim 5 and further comprising:
G. means defining a fluid bleed passage from the chamber of the fluid reservoir device, and pressure responsive means normally blocking said fluid bleed passage and unblocking said fluid bleed passage in response to excessive fluid pressure, thereby relieving excessive pressure in said fluid-filled system and said fluid reservoir device by bleeding fluid from said chamber through said fluid bleed passage.

7. A fluid reservoir device as defined in claim 6 wherein said fluid bleed passage connects with the inlet opening to said chamber and said pressure responsive means comprises:
1. a piston slideably mounted in the inlet opening to said chamber, the piston defining an opening therethrough to permit passage of fluid from the fluid-filled system to the chamber; and
2. spring biasing means normally maintaining said piston in a position blocking said fluid bleed passage,
said piston having a working surface exposed to the fluid such that excessive pressure of the fluid lifts the piston against its spring biasing means to permit fluid to escape through the fluid bleed passage.

8. A fluid reservoir device for connection to and use in conjunction with a fluid-filled system, the fluid reservoir device comprising:
A. A cylindrical chamber wall having an upper end and a lower end;
B. a bottom chamber wall disposed across the lower end of the cylindrical chamber wall, said bottom chamber wall including a mounting shank for attachment to a fluid-filled system and defining an inlet opening through said mounting shank and bottom chamber wall, thereby providing fluid communication from the fluid-filled system through said mounting shank and bottom chamber wall;
C. A first piston slideably mounted between an uppermost position and a lowermost position within said cylindrical chamber wall opposite said bottom chamber wall, said first piston having an annular bottom working surface, said annular bottom working surface having an outer periphery and an inner periphery, the outer periphery being slideably engaged against the cylindrical chamber wall and the inner periphery defining an opening, and a cylindrical wall extending upwardly from the inner periphery of the annular bottom working surface;
D. spring means biasing said first piston downwardly in the cylindrical chamber wall;
E. A second piston slideably mounted between an uppermost position and a lowermost position in the cylindrical wall of the first piston, said second piston having a circular bottom working surface having a outer periphery slideably engaged against the cylindrical wall upstanding from the inner periphery of the annular bottom working surface of the first piston; and
F. Spring means biasing said second piston downwardly in said cylindrical wall of said first piston, said spring means having a higher spring load than the spring means biasing said first piston downwardly within the cylindrical chamber wall.

said cylindrical chamber wall, bottom chamber wall and said first and second pistons defining a chamber closed except for the inlet opening, said chamber having a volume varying according to the positions of the slideably mounted first and second pistons, whereby when the chamber is filled with fluid when the first piston is in its uppermost position, the fluid reservoir device supplies fluid from the chamber to the fluid-filled system as required to maintain the system in full condition by means of spring biased downward movement of the first piston and the second piston mounted therein within the cylindrical chamber wall, and whereby additional fluid forced from the fluid-filled system is accommodated within the chamber by driving the second piston upwardly against its spring biasing means to enlarge the volume of the chamber.

9. A fluid reservoir device as defined in claim 8 wherein said mounting shank defines an enlarged portion of the inlet opening therein and a fluid bleed passage connecting with said enlarged portion of the inlet opening, said fluid bleed passage providing a discharge path for fluid from said chamber and fluid-filled system in fluid communication with said chamber, and further comprising:
G. a piston slideably mounted in the enlarged portion of the inlet opening; and
H. spring means biasing said piston to a position blocking the fluid bleed passage,
said piston having a working surface which lifts the piston against the spring biasing means upon application of excessively high pressure to expose the fluid bleed passage through which fluid may escape to relieve the excessively high pressure condition 10. A fluid reservoir device as defined in claim 8 and further comprising a handle secured to the first piston for lifting the first piston to its uppermost position, whereby fluid is drawn from the fluid-filled system into the chamber to fill the chamber.

11. A fluid reservoir device as defined in claim 10 and further comprising a cylindrical cover surrounding the cylindrical chamber wall and attached to said first piston, wherein said cover moves up and down together with said first piston relative to the cylindrical chamber wall and provides a visual indication of the position of said first piston within the cylindrical chamber wall of the fluid reservoir device.

12. A fluid reservoir device as defined in claim 11 wherein said cylindrical chamber wall has a band on its outer surface and wherein said cover has an opening formed therein to expose said band when the first piston is near its lowermost position within the cylindrical chamber wall of the reservoir device.

* * * * *